United States Patent
Lu

(10) Patent No.: US 10,375,762 B2
(45) Date of Patent: Aug. 6, 2019

(54) AUTOMATIC ACCESS POINT DEPLOYMENT METHOD AND DEVICE THEREOF

(71) Applicant: U-MEDIA COMMUNICATIONS, INC., Hsinchu (TW)

(72) Inventor: Gang-Heng Lu, Hsinchu (TW)

(73) Assignee: U-MEDIA Communications, Inc., Hsinchu (TW)

( * ) Notice: Subject to any disclaimer, the term of this patent is extended or adjusted under 35 U.S.C. 154(b) by 42 days.

(21) Appl. No.: 15/621,361

(22) Filed: Jun. 13, 2017

(65) Prior Publication Data

US 2018/0263077 A1    Sep. 13, 2018

(30) Foreign Application Priority Data

Mar. 13, 2017   (TW) .............................. 106108174 A

(51) Int. Cl.
| | |
|---|---|
| H04W 92/10 | (2009.01) |
| H04W 16/10 | (2009.01) |
| H04W 36/06 | (2009.01) |
| H04W 72/04 | (2009.01) |
| H04W 88/08 | (2009.01) |
| H04W 16/20 | (2009.01) |
| H04W 84/18 | (2009.01) |

(52) U.S. Cl.
CPC ........... *H04W 92/10* (2013.01); *H04W 16/10* (2013.01); *H04W 16/20* (2013.01); *H04W 36/06* (2013.01); *H04W 72/04* (2013.01); *H04W 88/08* (2013.01); *H04W 84/18* (2013.01)

(58) Field of Classification Search
CPC ..... H04W 92/10; H04W 16/10; H04W 36/06; H04W 72/04; H04W 88/08
See application file for complete search history.

(56) References Cited

U.S. PATENT DOCUMENTS

| | | |
|---|---|---|
| 2014/0226524 A1 | 8/2014 | Kalika et al. |
| 2015/0133166 A1 | 5/2015 | Edge |

*Primary Examiner* — Ronald B Abelson
(74) *Attorney, Agent, or Firm* — Winston Hsu

(57) ABSTRACT

An automatic access point (AP) deployment method executed within an indoor environment by an automatic AP deployment device includes: building a coordinate map of the indoor environment; setting a request information, while the wireless APs at least include one Wi-Fi AP and one Bluetooth AP respectively corresponding to Wi-Fi AP deployment plans and Bluetooth AP deployment plans; calculating a fitness value for each of the Wi-Fi and Bluetooth AP deployment plans; calculating an overall fitness value, and determining whether the overall fitness value is satisfied with a convergence condition; exchanging the deployment position values of at least two Wi-Fi AP deployment plans and at least two Bluetooth AP deployment plans; and changing at least one deployment position value of at least one Wi-Fi AP deployment plan and at least one Bluetooth AP deployment plan and again calculating the fitness value for each Wi-Fi and Bluetooth AP deployment plans.

14 Claims, 6 Drawing Sheets

| wAP1 | 1 | 0 | 0 | 1 | 0 | 0 | 0 | 0 | 0 | 0 | 0 | 0 | 0 | 0 |
|---|---|---|---|---|---|---|---|---|---|---|---|---|---|---|
| wAP2 | 0 | 0 | 0 | 0 | 0 | 0 | 0 | 0 | 0 | 0 | 1 | 0 | 0 | 1 |
| wAP3 | 1 | 0 | 0 | 0 | 0 | 0 | 0 | 0 | 0 | 0 | 0 | 0 | 0 | 1 |
| wAP4 | 0 | 0 | 0 | 1 | 0 | 0 | 0 | 0 | 0 | 0 | 1 | 0 | 0 | 0 |
| bAP1 | 0 | 0 | 0 | 0 | 0 | 0 | 0 | 1 | 0 | 0 | 0 | 0 | 0 | 0 |
| bAP2 | 0 | 0 | 0 | 0 | 0 | 0 | 0 | 0 | 1 | 0 | 0 | 0 | 0 | 0 |
| bAP3 | 0 | 0 | 0 | 0 | 0 | 0 | 0 | 0 | 1 | 0 | 0 | 0 | 0 | 0 |
| bAP4 | 0 | 0 | 0 | 0 | 0 | 0 | 0 | 0 | 0 | 1 | 0 | 0 | 0 | 0 |

FIG. 5

AUTOMATIC ACCESS POINT DEPLOYMENT METHOD AND DEVICE THEREOF

BACKGROUND OF THE INVENTION

1. Field of the Invention

The present disclosure relates to an automatic access point (AP) deployment method and a device thereof; in particular, to an automatic Wi-Fi access point deployment method and an automatic Wi-Fi access point deployment device.

2. Description of Related Art

Within an indoor environment, if all wireless access points are well deployed, it will be easy to monitor this indoor environment by using these wireless access points to accurately position a portable device within this indoor environment.

Usually, to position a portable device in an indoor environment or to monitor an indoor environment, a plurality of Wi-Fi access points should be deployed within the indoor environment. However, since the Wi-Fi signal strength and the Wi-Fi signal coverage are large, it may not be precise to position a portable device in an indoor environment or to monitor an indoor environment by using the Wi-Fi access points randomly deployed within the indoor environment. Alternatively, Bluetooth access points can also be used for positioning a portable device in an indoor environment or for monitoring an indoor environment. However, compared with a signal from a Wi-Fi access point, the signal from a Bluetooth access point is weaker and unstable. Thus, in this case, a large number of Bluetooth access points should be configured in this indoor environment for positioning a portable device or for monitoring this indoor environment, which is costly to achieve.

Thus, it is necessary to provide a way of improving the performance of wirelessly monitoring an indoor environment and increasing the accuracy of positioning a portable device within an indoor environment with a limited number of physical access points.

SUMMARY OF THE INVENTION

The present disclosure provides an automatic access point deployment method and an automatic access point deployment device for deploying Wi-Fi access points and Bluetooth access points within an indoor environment. Even though the number of the wireless access points may be restricted because of cost-aware policies, these Wi-Fi access points and Bluetooth access points can be automatically deployed at the most suitable position coordinates of the coordinate map in an indoor environment by using the automatic access point deployment method and the automatic access point deployment device provided by the present disclosure. By doing so, the performance of wirelessly monitoring the indoor environment can be improved and the accuracy of positioning an electronic device within the indoor environment can be increased.

The automatic access point deployment method provided by the present disclosure is used for deploying a plurality of access points according to different position coordinates within an indoor environment by using an automatic access point deployment device. This automatic access point deployment method includes: step 1: building a coordinate map of the indoor environment, wherein the coordinate map includes a plurality of rows and columns, and a plurality of position coordinates are defined by the rows and columns; step 2: setting a request information, wherein the request information includes a number of the wireless access points, the wireless access points at least include one Wi-Fi access point and one Bluetooth access point, the Wi-Fi access point and the Bluetooth access point respectively correspond to a plurality of Wi-Fi AP deployment plans and a plurality of Bluetooth AP deployment plans, and each of the Wi-Fi AP deployment plans and the Bluetooth AP deployment plans has a plurality of deployment position values, and wherein the deployment position values of each Wi-Fi AP deployment plan indicate the likely position coordinates of the Wi-Fi access points within the indoor environment, and the deployment position values of each Bluetooth AP deployment plan indicate the likely position coordinates of the Bluetooth access points within the indoor environment; step 3: calculating a fitness value for each Wi-Fi AP deployment plan and each Bluetooth AP deployment plan according to the request information; step 4: calculating an overall fitness value according to the fitness values, and determining whether the overall fitness value is satisfied with a convergence condition; step 5: exchanging the deployment position values of at least two Wi-Fi AP deployment plans and exchanging the deployment position values of at least two Bluetooth AP deployment plans when the overall fitness value is not satisfied with the convergence condition; and step 6: changing at least one deployment position value of at least one Wi-Fi AP deployment plan, changing at least one deployment position value of at least one Bluetooth AP deployment plan and again calculating the fitness value for each Wi-Fi AP deployment plan and each Bluetooth AP chromosome, wherein the deployment position value of the one Wi-Fi AP deployment plan has not yet been exchanged and the deployment position value of the one Bluetooth AP deployment plan has not yet been exchanged.

The automatic access point deployment device provided by the present disclosure includes a storage device and a processor. The storage device stores a request information. The request information includes a number of the wireless access points, and the wireless access points at least include one Wi-Fi access point and one Bluetooth access point. The processor is electrically connected to the storage device. The processor is configured to execute steps including: step 1: building a coordinate map of the indoor environment, wherein the coordinate map includes a plurality of rows and columns, and a plurality of position coordinates are defined by the rows and columns; step 2: setting a request information, wherein the request information includes a number of the wireless access points, the wireless access points at least include one Wi-Fi access point and one Bluetooth access point, the Wi-Fi access point and the Bluetooth access point respectively correspond to a plurality of Wi-Fi AP deployment plans and a plurality of Bluetooth AP deployment plans, and each of the Wi-Fi AP deployment plans and the Bluetooth AP deployment plans has a plurality of deployment position values, and wherein the deployment position values of each Wi-Fi AP deployment plan indicate the likely position coordinates of the Wi-Fi access points within the indoor environment, and the deployment position values of each Bluetooth AP deployment plan indicate the likely position coordinates of the Bluetooth access points within the indoor environment; step 3: calculating a fitness value for each Wi-Fi AP deployment plan and each Bluetooth AP deployment plan according to the request information; step 4: calculating an overall fitness value according to the fitness values, and determining whether the overall fitness value is satisfied with a convergence condition; step 5: exchanging the deployment position values of at least two Wi-Fi AP deployment plans and exchanging the deployment position values of at least two Bluetooth AP deployment plans when the overall fitness value is not satisfied with the convergence condition; and step 6: changing at least one deployment position value of at least one Wi-Fi AP deployment plan, changing at least one deployment position value of at least one Bluetooth AP deployment plan and again calculating the fitness value for each Wi-Fi AP deployment plan and each Bluetooth AP deployment plan, wherein the deployment position value of the one Wi-Fi AP deployment plan has not yet been exchanged and the deployment position value of the one Bluetooth AP deployment plan has not yet been exchanged.

By using the automatic access point deployment method and the automatic access point deployment device provided by the present disclosure, even though the number of the wireless access points may be restricted because of cost-aware policies, these wireless access points (including the Wi-Fi access points and the Bluetooth access points) can be automatically deployed at the most suitable position coordinates of the coordinate map in an indoor environment. Therefore, the performance of wirelessly monitoring the indoor environment by using these wireless access points can be effectively improved, and the accuracy of positioning a portable device within the indoor environment by using these wireless access points can be increased.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which:

FIG. 5 shows a schematic diagram demonstrating the deployment position values of at least two Wi-Fi AP deployment plans and the deployment position values of at least two Bluetooth AP deployment plans according to one embodiment of the present disclosure;

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 1:
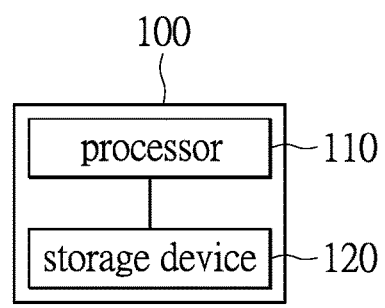
FIG. 1 shows a schematic diagram of an automatic access point deployment device according to one embodiment of the present disclosure.
Figure 3:
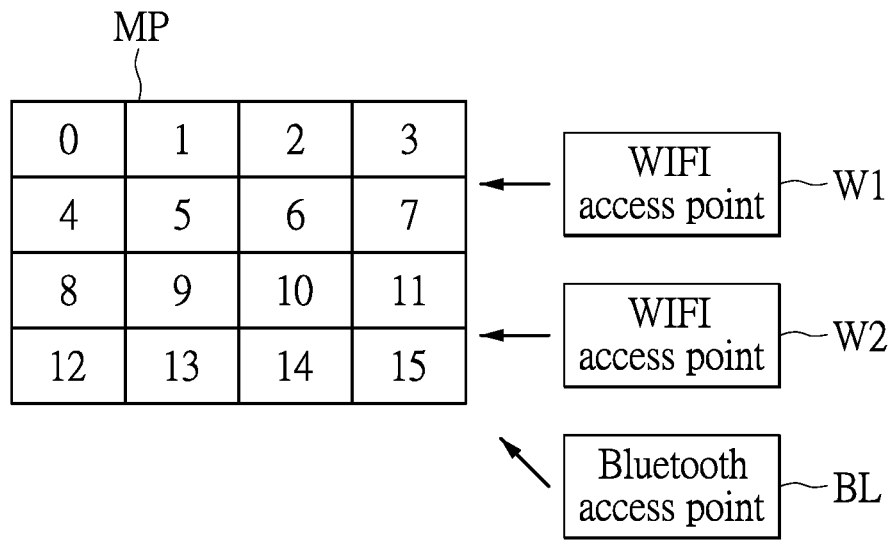
FIG. 3 shows a relationship between Wi-Fi access points and the coordinate map and shows a relationship between Bluetooth access points and the coordinate map according to one embodiment of the present disclosure.

Referring to FIG. 1, a schematic diagram of an automatic access point deployment according to one embodiment of the present disclosure is shown. The automatic access point deployment device 100 is configured to deploy a plurality of wireless access points, including at least one Wi-Fi access point and at least one Bluetooth access point, within an indoor environment. The automatic access point deployment device 100 assigns a position coordinate of the indoor environment to each wireless access point so that the wireless access points can be well deployed within the indoor environment. FIG. 3 shows a relationship between Wi-Fi access points and the coordinate map and shows a relationship between Bluetooth access points and the coordinate map in one embodiment of the present disclosure. In FIG. 3, a coordinate map MP is built for an indoor environment. The coordinate map MP includes four rows and four columns, and thus 16 position coordinates are defined by these rows and columns, which are 0, 1, 2, 3, 4, 5, 6, 7, 8, 9, 10, 11, 12, 13, 14 and 15. The automatic access point deployment device 100 deploys at least one Wi-Fi access point and at least one Bluetooth access point by assigning each of them a position coordinate 0~15 of the coordinate map according to an automatic access point deployment method. This automatic access point deployment method will be illustrated later, and in this embodiment the automatic access point deployment device 100 can be implemented by a smart phone, a personal computer, a laptop or the like.

The automatic access point deployment device 100 includes a processor 110 and a storage device 120, and the processor 110 is electrically connected to the storage device 120. The storage device 120 is configured to store the request information. The request information includes the number of wireless access points, and these wireless access points include at least one Wi-Fi access point and at least one Bluetooth access point. Details about how the automatic access point deployment device 100 stores the request information in its storage device 120 should be easily understood by those skilled in the art, and thus is not reiterated herein. In this embodiment, the storage device 120 can be implemented by a volatility memory chip or a non-volatility memory, such as a flash memory chip, a read only memory chip or a random access memory chip.

The processor 110 plays the role of the operating center of the automatic access point deployment device 100, responsible for each kind of analysis, calculations and controls. For example, the processor 110 can be a central processing unit, a microcontroller or an embedded controller. The processor 110 can execute the following steps to deploy at least one Wi-Fi access point and at least one Bluetooth access point by assigning each of them a position coordinate of the coordinate map MP.

Figure 2:
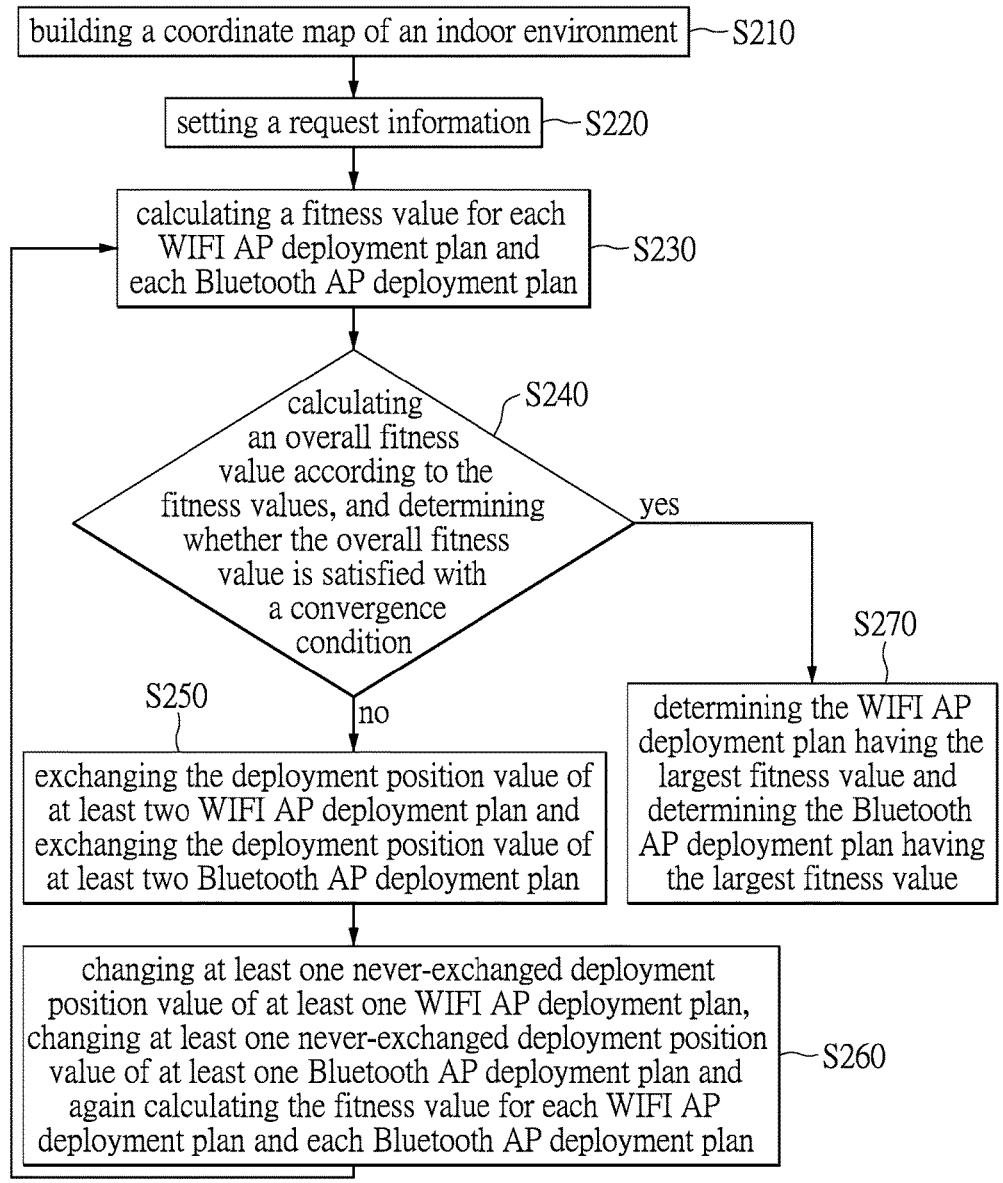
FIG. 2 shows a flow chart of an automatic access point deployment method according to one embodiment of the present disclosure.

Referring to FIG. 2, a flow chart of an automatic access point deployment according to one embodiment of the present disclosure is shown. In step S210, the processor 110 builds a coordinate map MP of an indoor environment. For example, in FIG. 3, the coordinate map MP includes four rows and four columns, and a plurality of position coordinates 0~15 are defined by these rows and columns. In other words, in the coordinate map MP of the indoor environment, there are 16 position coordinates 0~15.

In step S220, the processor 110 sets the request information. The request information includes a number of the wireless access points, and the wireless access points at least include one Wi-Fi access point and one Bluetooth access point. A user can use the processor 110 to set the request information according to his needs. For example, the number of the Wi-Fi access points can be set to be two and the number of the Bluetooth access points can be set to be one (as shown in FIG. 3, there are two Wi-Fi access points W1 and W2 and one Bluetooth access point BL). Further, the user can set rules for deploying the Wi-Fi access points and the Bluetooth access points. For example, in FIG. 4, the Wi-Fi access points W1 and W2 can only be deployed at two of the position coordinates 0, 3, 12 and 15 of the coordinate map MP1, and the Bluetooth access point BL can be deployed at one of the position coordinates 0~15 of the coordinate map MP1.

Specifically, when the processor 110 is deploying the Wi-Fi access points and the Bluetooth access points, each of the Wi-Fi access points corresponds to a plurality of Wi-Fi AP deployment plans and each of the Bluetooth access points corresponds to a plurality of Bluetooth AP deployment plans. Each of the Wi-Fi AP deployment plans has a plurality of deployment position values, and also each of the Bluetooth AP deployment plans has a plurality of deployment position values. The deployment position values of each Wi-Fi AP deployment plan may become the position coordinates where the Wi-Fi access points will be deployed within the indoor environment, and the deployment position values of each Bluetooth AP deployment plan may become the position coordinates where the Bluetooth access points will be deployed within the indoor environment.

Figure 4:
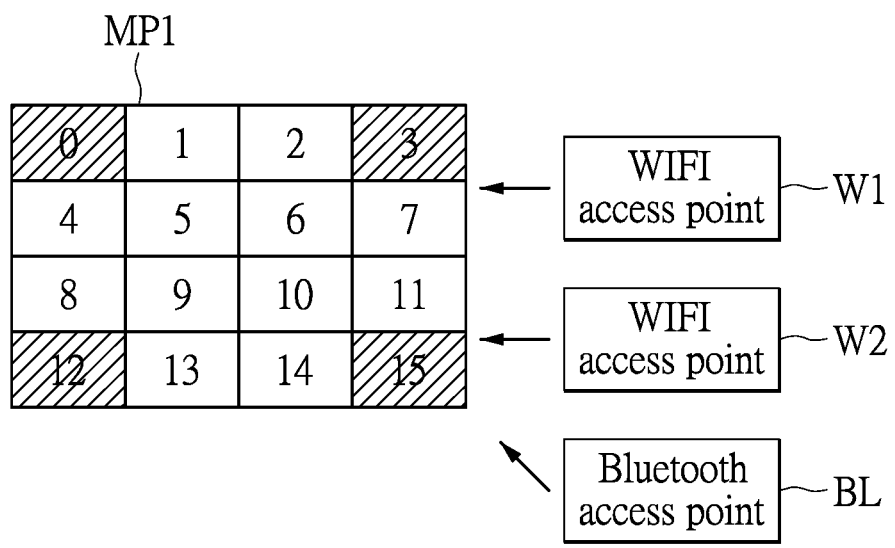
FIG. 4 shows a relationship between Wi-Fi access points and the coordinate map and shows a relationship between Bluetooth access points and the coordinate map according to another embodiment of the present disclosure.

In FIG. 4, the Wi-Fi access points W1 and W2 can only be deployed at two of the position coordinates 0, 3, 12 and 15 of the coordinate map MP1, and the Bluetooth access point BL can be deployed at one of the position coordinates 0~15 of the coordinate map MP1. Referring to FIG. 5, a schematic diagram demonstrating the deployment position values of at least two Wi-Fi AP deployment plans and the deployment position values of at least two Bluetooth AP deployment plans in one embodiment of the present disclosure is shown. In FIG. 5, the processor 110 assigns four Wi-Fi AP deployment plans wAP1, wAP2, wAP3 and wAP4 to the Wi-Fi access points W1 and W2, and the processor 110 assigns four Bluetooth AP deployment plans bAP1, bAP2, bAP3 and bAP4 to the Bluetooth access point BL.

These four Wi-Fi AP deployment plans wAP1~wAP4 indicate how the Wi-Fi access points W1 and W2 may be deployed according to the coordinate map MP1, and thus the four Wi-Fi AP deployment plans wAP1~wAP4 are respectively represented by a plurality of deployment position values. In one example, the Wi-Fi AP deployment plan wAP1 is [1001 0000 0000 0000], which indicates that the Wi-Fi access points W1 and W2 can be deployed at the position coordinates 0 and 3; the Wi-Fi AP deployment plan wAP2 is [0000 0000 0000 1001], which indicates that the Wi-Fi access points W1 and W2 can be deployed at the position coordinates 12 and 15; the Wi-Fi AP deployment plan wAP3 is [1000 0000 0000 0001], which indicates that the Wi-Fi access points W1 and W2 can be deployed at the position coordinates 0 and 15; and the Wi-Fi AP deployment plan wAP4 is [0001 0000 0000 1000], which indicates that the Wi-Fi access points W1 and W2 can be deployed at the position coordinates 3 and 12.

Similarly, the four Bluetooth AP deployment plans bAP1~bAP4 indicate how the Bluetooth access point BL may be deployed according to the coordinate map MP1, and thus the four Bluetooth AP deployment plans bAP1~bAP4 are respectively represented by a plurality of deployment position values. In one example, the Bluetooth AP deployment plan bAP1 is [0000 0000 1000 0000], which indicates that the Bluetooth access point BL can be deployed at the position coordinate 8; the Bluetooth AP deployment plan bAP2 is [0000 0000 0100 0000], which indicates that the Bluetooth access point BL can be deployed at the position coordinate 9; the Bluetooth AP deployment plan bAP3 is [0000 0000 0010 0000], which indicates that the Bluetooth access point BL can be deployed at the position coordinate 10; and the Bluetooth AP deployment plan bAP4 is [0000 0000 0001 0000], which indicates that the Bluetooth access point BL can be deployed at the position coordinate 11.

In this embodiment, the number of the Wi-Fi AP deployment plans and the number of the Bluetooth AP deployment plans can be previously stored in the storage device 120, or can be freely set by a user by using the processor 110.

In step S230, the processor 110 calculates a fitness value for each Wi-Fi AP deployment plan wAP1~wAP4 and each Bluetooth AP deployment plan bAP1~bAP4 according to the request information to deploy the Wi-Fi access points and the Bluetooth access points at suitable position coordinates. Specifically, for each Wi-Fi AP deployment plan, according to a Wi-Fi signal strength corresponding to each deployment position value, the processor 110 calculates a Wi-Fi signal coverage and a Wi-FiWi-Fi throughput. Further, according to the Wi-Fi signal coverage and the Wi-Fi throughput, the processor 110 calculates a fitness value for each Wi-Fi AP deployment plan. Additionally, for each Bluetooth AP deployment plan, according to a Bluetooth signal strength corresponding to each deployment position value, the processor 110 calculates an amount of the Bluetooth signal coverage and a non-overlapping percentage of the Bluetooth access points. Further, according to the amount of the Bluetooth signal coverage and the non-overlapping percentage of the Bluetooth access points, the processor 110 calculates a fitness value for each Bluetooth access point. It should be noted that, the larger the non-overlapping percentage of the Bluetooth access points is, the lower the possibility of incorrectly determining the proper position coordinates of the Bluetooth access points will be.

The following description illustrates how the Wi-Fi signal coverage and the Wi-Fi throughput for the Wi-Fi AP deployment plan wAP1 are calculated. As shown in FIG. 4 and FIG. 5, the Wi-Fi AP deployment plan wAP1 is [1001 0000 0000 0000], and thus the Wi-Fi AP deployment plan wAP1 indicates that the Wi-Fi access points W1 and W2 can be deployed at the position coordinates 0 and 3. For the position coordinates 0~15, if the Wi-Fi signal strengths of a signal received at position coordinates 0~11 from the Wi-Fi access points W1 and W2 are larger than or equal to a predetermined signal strength and the Wi-Fi signal strengths of a signal received at position coordinates 12~15 from the Wi-Fi access points W1 and W2 are smaller than the predetermined signal strength, the Wi-Fi signal coverage is calculated to be 0.75 (12/16=0375). The Wi-Fi throughput is the sum of the Wi-Fi signal strengths of the signals received at each of the position coordinates 0~15 from the Wi-Fi access points W1 and W2. For example, the Wi-Fi throughput can be calculated to be −30 dbm. After that, according to the Wi-Fi signal coverage and the Wi-Fi throughput, the processor 110 calculates a fitness value for each Wi-Fi AP deployment plan. In this case, the fitness value fv of the Wi-Fi AP deployment plan wAP1 equals (w1*0.75)+(w2*−30), which is 0.3, wherein "w1" is an adjustment parameter of the Wi-Fi signal coverage and "w2" is an adjustment parameter of the Wi-Fi throughput.

The following description illustrates how the amount of the Bluetooth signal coverage and the non-overlapping percentage of the Bluetooth APs for the Bluetooth AP deployment plan bAP1 are calculated. As shown in FIG. 4 and FIG. 5, the Bluetooth AP deployment plan bAP1 is [0000 0000 1000 0000], and thus the Bluetooth AP deployment plan bAP1 indicates that the Bluetooth access point BL can be deployed at the position coordinate 8. For the position coordinates 0~15, if the Bluetooth signal strengths of a signal received at position coordinates 0~2 and 4~14 from the Bluetooth access point BL are larger than or equal to a predetermined signal strength and the Bluetooth signal strengths of a signal received at position coordinates 3 and 15 from the Bluetooth access point BL are smaller than the predetermined signal strength, the amount of the Bluetooth signal coverage equals to 14 (16−2). This indicates that the Bluetooth signal coverage covers 14 position coordinates including the position coordinates 0~2 and 4~14. For the Bluetooth AP deployment plan bAP1, the number of the Bluetooth access point is only one. Thus, the non-overlapping percentage of the Bluetooth access points equals 1 (1−0/16). After that, according to the amount of the Bluetooth signal coverage and the non-overlapping percentage of the Bluetooth access points, the processor 110 calculates a fitness value for each Bluetooth AP deployment plan. In this case, the fitness value fv of the Bluetooth AP deployment plan bAP1 equals to w3 (w3*1), wherein "w3" is an adjustment parameter.

However, the way of calculating the Wi-Fi signal coverage and the Wi-Fi throughput for a Wi-Fi AP deployment plan and the way of calculating the amount of the Bluetooth signal coverage and the non-overlapping percentage of the Bluetooth APs for a Bluetooth AP deployment plan are not restricted by the above mentioned ways. In the above instance, according to the request information, the processor 110 can calculate a fitness value fv for each Wi-Fi AP deployment plan wAP1~wAP4 and can calculate a fitness value fv for each Bluetooth AP deployment plan bAP1~bAP4 as shown in the following Table 1.

TABLE 1

| Wi-Fi AP chromosome | fitness value (fv) | Bluetooth AP chromosome | fitness value (fv) |
| --- | --- | --- | --- |
| wAP1 | 0.30 | bAP1 | 0.20 |
| wAP2 | 0.25 | bAP2 | 0.30 |
| wAP3 | 0.20 | bAP3 | 0.25 |
| wAP4 | 0.10 | bAP4 | 0.10 |

In step S240, according to these fitness values shown in Table 1, the processor 110 calculates an overall fitness value to determine whether the overall fitness value is satisfied with a convergence condition. After the overall fitness value is calculated by the processor 110, which is 0.75, the processor 110 further determines whether "0.75" is satisfied with the convergence condition. If the processor 110 determines that "0.75" is not satisfied with the convergence condition, the method proceeds to step S250. On the other hand, if the processor 110 determines that "0.75" is satisfied with the convergence condition, the method proceeds to step S270.

In step S250, the processor 110 exchanges the deployment position values of at least two Wi-Fi AP deployment plans and exchanges the deployment position values of at least two Bluetooth AP deployment plans. The request information stored in the storage device 120 includes a number of the Wi-Fi AP deployment plans of which the deployment position values have to be exchanged (such as, two Wi-Fi AP deployment plans) and a number of the Bluetooth AP deployment plans of which the deployment position values have to be exchanged (such as, three Bluetooth AP deployment plans). Accordingly, the processor 110 can determine how many of the Wi-Fi AP deployment plans should have their deployment position values exchanged and how many of the Bluetooth AP deployment plans should have their deployment position values exchanged.

Figure 6:
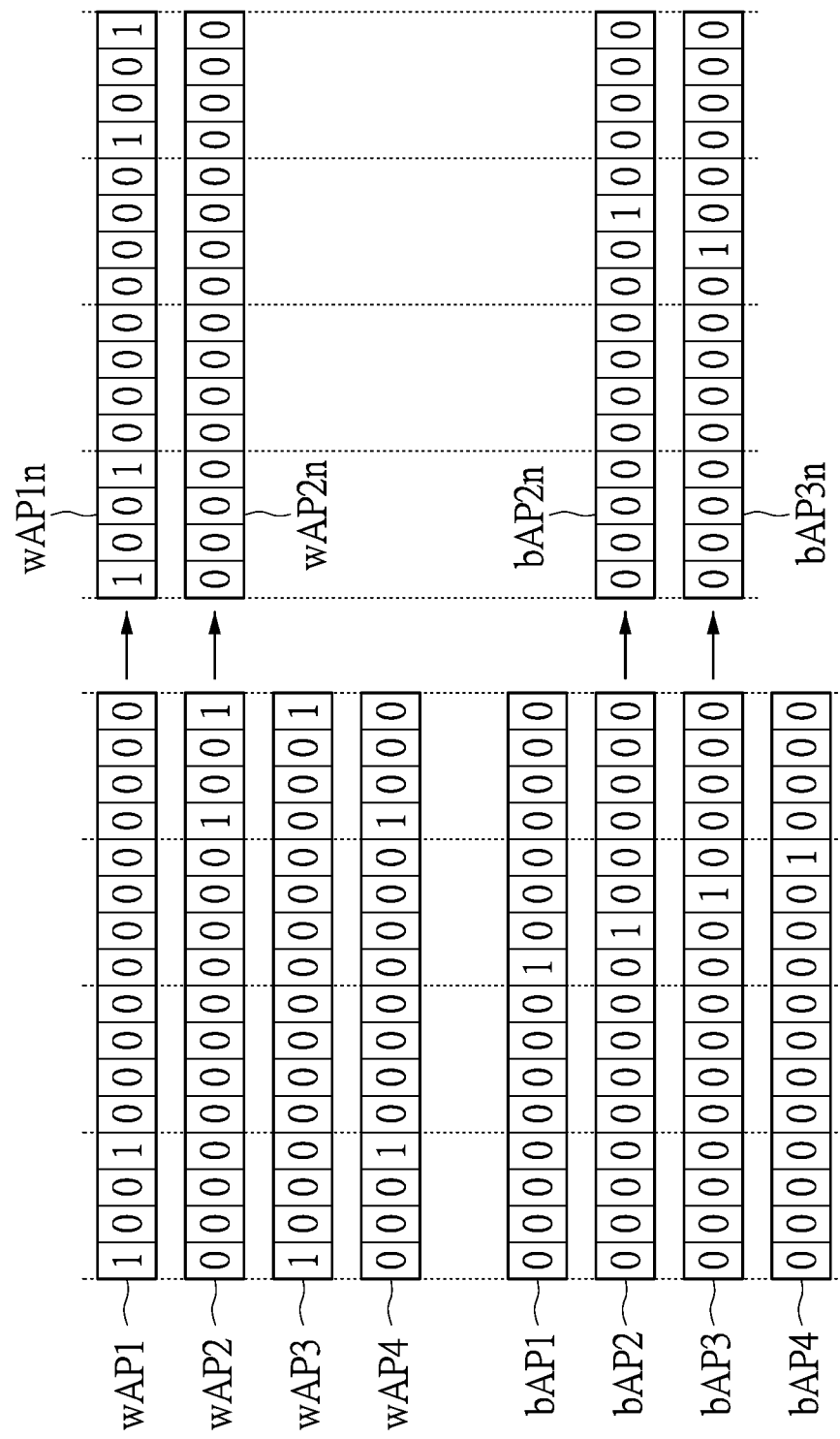
FIG. 6 shows a schematic diagram demonstrating how the deployment position values of at least two Wi-Fi AP deployment plans are exchanged and how the deployment position values of at least two Bluetooth AP deployment plans are exchanged according to one embodiment of the present disclosure.

The request information stored in the storage device 120 can also include an exchanging ratio. According to this exchanging ratio, the processor 110 can determine how many of the Wi-Fi AP deployment plans should have their deployment position values exchanged and how many of the Bluetooth AP deployment plans should have their deployment position values exchanged. If the exchanging ratio is 50%, in the above case, the processor 110 will choose two Wi-Fi AP deployment plans (50% of four Wi-Fi AP deployment plans) to exchange their deployment position values, and choose two Bluetooth AP deployment plans (50% of four Bluetooth AP deployment plans) to exchange their deployment position values. Referring to FIG. 6, a schematic diagram demonstrating how the deployment position values of at least two Wi-Fi AP deployment plans are exchanged and how the deployment position values of at least two Bluetooth AP deployment plans are exchanged in one embodiment of the present disclosure is shown. In FIG. 6, the processor 110 randomly chooses the Wi-Fi AP deployment plans wAP1 and wAP2 to exchange their deployment position values and randomly chooses the Bluetooth AP deployment plans bAP2 and bAP32 to exchange their deployment position values.

Additionally, the processor 110 can make the AP deployment plans exchange their deployment position values according to the exchanging ratio. If the exchanging ratio is 50%, the processor 110 will make two chosen Wi-Fi AP deployment plans exchange 50% of their deployment position values and make two chosen Bluetooth AP deployment plans exchange 50% of their deployment position values. Take the embodiment shown by FIG. 6 for example, the processor 110 makes the Wi-Fi AP deployment plans wAP1 and wAP2 exchange the second half of their deployment position values, and thus the new Wi-Fi AP deployment plans wAP1$n$ and wAP2$n$ are generated. As shown in FIG. 6, the Wi-Fi AP deployment plan wAP1$n$ is [1001 0000 0000 1001] and the Wi-Fi AP deployment plan wAP2$n$ is [0000 0000 0000 0000]. Similarly, the processor 110 makes the Bluetooth AP deployment plans bAP2 and bAP3 exchange the second half of their deployment position values, and thus the new Bluetooth AP deployment plans bAP2$n$ and bAP3$n$ are generated. As shown in FIG. 6, the Bluetooth AP deployment plan bAP2$n$ is [0000 0000 0010 0000] and the Bluetooth AP deployment plan bAP3$n$ is [0000 0000 0100 0000].

Alternatively, the user can freely determine how many Wi-Fi AP deployment plans should have their deployment position values exchanged, how many Bluetooth AP deployment plans should have their deployment position values exchanged, and which deployment position values of the chosen Wi-Fi AP deployment plans or the chosen Bluetooth AP deployment plans should be exchanged by using the processor 110.

In step S260, the processor 110 changes at least one deployment position value of at least one Wi-Fi AP deployment plan and changes at least one deployment position value of at least one Bluetooth AP deployment plan, wherein the deployment position values of the one Wi-Fi AP deployment plan have not yet been exchanged and the deployment position values of the one Bluetooth AP deployment plan have not yet been exchanged. The request information stored in the storage device 120 can include a number of the Wi-Fi AP deployment plans of which the deployment position values have to be changed (such as one Wi-Fi AP chromosome) and a number of the Bluetooth AP deployment plans of which the deployment position values have to be changed (such as one Bluetooth AP chromosome), wherein the deployment position values of these Wi-Fi AP deployment plans and the deployment position values of these Bluetooth AP deployment plans have not been exchanged yet. Accordingly, the processor 110 can determine how many Wi-Fi AP deployment plans should have their deployment position values changed and how many Bluetooth AP deployment plans should have their deployment position values changed, wherein the deployment position values of these Wi-Fi AP deployment plans and the deployment position values of these Bluetooth AP deployment plans have not been exchanged yet.

Moreover, the request information can include a number of deployment position values that should be exchanged. Accordingly, the processor 110 can determine how many deployment position values of the Wi-Fi AP deployment plan should be changed and how many deployment position values of the Bluetooth AP chromosome should be changed. For a Bluetooth AP deployment plan or for a Wi-Fi AP deployment plan, if the number of the deployment position values that have to be changed is two, the processor 110 will change two of the deployment position values of the Wi-Fi AP deployment plan and change two of the deployment position values of the Bluetooth AP deployment plan.

Figure 7:
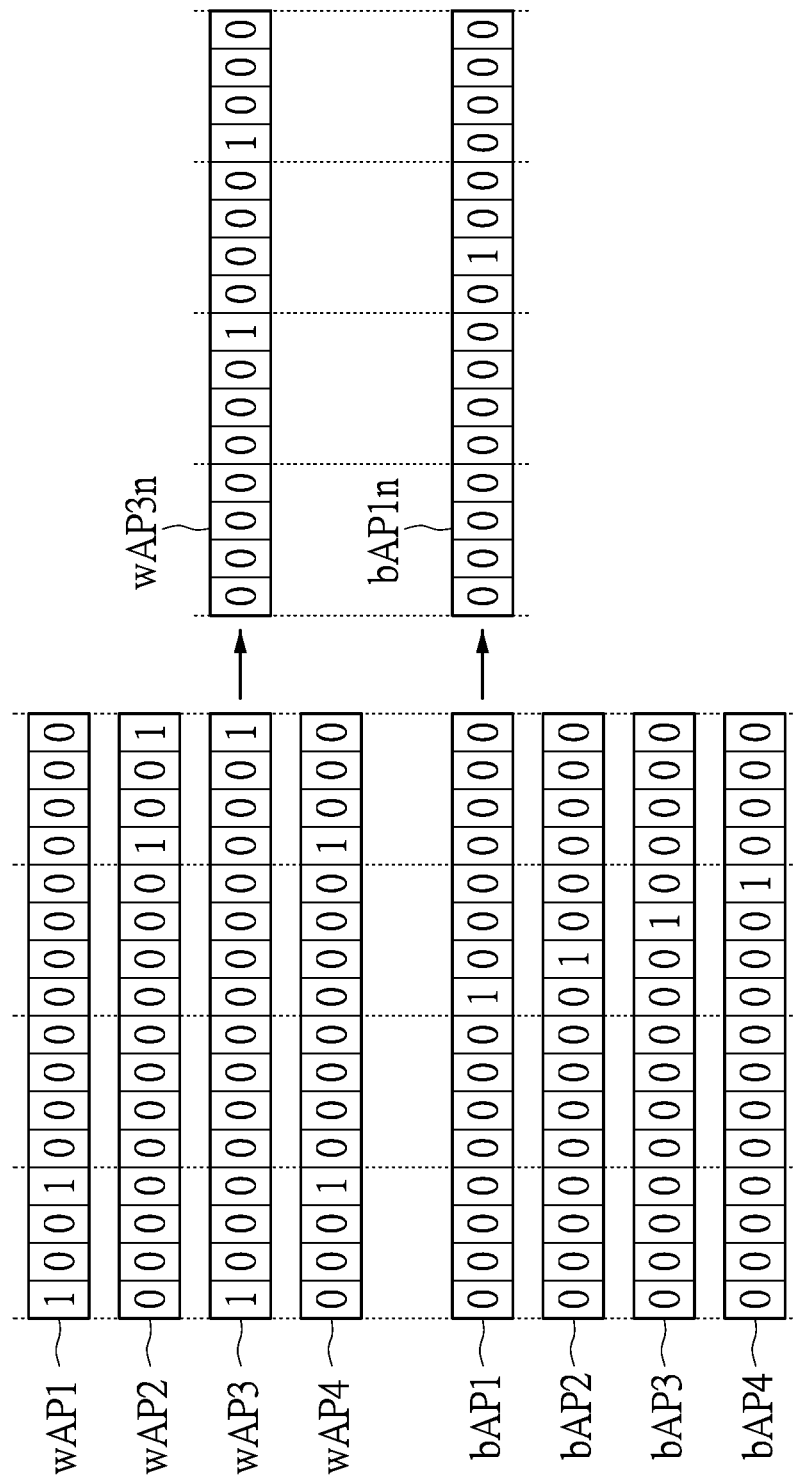
FIG. 7 shows a schematic diagram demonstrating how the deployment position values of the Wi-Fi AP deployment plan, which have not yet been exchanged, are changed and how the deployment position values of the Bluetooth AP deployment plan, which have not yet been exchanged, are changed according to one embodiment of the present disclosure.

The request information can include a rate of change. In one example, the rate of change is 40%, and the processor 110 randomly generates a possibility value, such as 20%. In this example, the possibility value is smaller than the rate of change (20% is smaller than 40%), so that the processor 110 changes at least one deployment position value of at least one Wi-Fi AP deployment plan of which the deployment position values have not been changed yet, and also the processor 110 changes at least one deployment position value of at least one Bluetooth AP deployment plan of which the deployment position values have not been changed yet. FIG. 7 shows a schematic diagram demonstrating how the deployment position values of the Wi-Fi AP deployment plan, which have not yet been exchanged, are changed and how the deployment position values of the Bluetooth AP deployment plan, which have not yet been exchanged, are changed in one embodiment of the present disclosure. In FIG. 7, the possibility value randomly generated by the processor 110 is smaller than the rate of change (20% is smaller than 40%), so that the processor 110 chooses the Wi-Fi AP deployment plan wAP3 and changes four deployment position values of the Wi-Fi AP deployment plan wAP3, and thus a new Wi-Fi AP deployment plan AP3$n$ is generated. In an exemplary configuration, the Wi-Fi AP deployment plan AP3$n$ is [0000 0001 0000 1000]. Similarly, the processor 110 chooses the Bluetooth AP deployment plan bAP1 and changes two deployment position values of the Bluetooth AP deployment plan bAP1, thus a new Bluetooth AP deployment plan bAP1$n$ is generated. In an exemplary configuration, the Bluetooth AP deployment plan bAP1$n$ is [0000 0000 0100 0000].

On the other hand, if the possibility value randomly generated by the processor 110 is larger than or equal to the rate of change, the processor 110 does not change any deployment position value of the Wi-Fi AP deployment plan of which the deployment position values have not been changed yet, and does not change any deployment position value of the Bluetooth deployment plan of which the deployment position values have not been changed yet.

After the step S260 is finished, the method returns to step S230 to again calculate the fitness value for each Wi-Fi AP deployment plan and each Bluetooth AP deployment plan. The processor 110 repeatedly executes steps S230~S260 until the overall fitness value is satisfied with the convergence condition. When the overall fitness value is satisfied with the convergence condition, the processor 110 proceeds to step S270. In step S270, the processor 110 determines the Wi-Fi AP deployment plan having the largest fitness value and determines the Bluetooth AP deployment plan having the largest fitness value. After that, in order to find the most suitable position coordinates for the Wi-Fi access point W1, the Wi-Fi access point W2 and the Bluetooth access point BL of the coordinate map MP in the indoor environment, the processor 110 associates the deployment position values of the determined Wi-Fi AP deployment plan and the deployment position values of the determined Bluetooth AP deployment plan with the position coordinates of the coordinate map MP in the indoor environment.

It is worth mentioning that, the convergence condition may indicate a predetermined times of executing steps S230~S260, such as 100 times. Alternatively, the convergence condition may indicate that the overall fitness value is larger than or equal to a predetermined fitness value, such as 0.9 (the overall fitness value)≥0.7 (the predetermined fitness value). However, the user can freely set the convergence condition by using the processor 110, which is not limited herein.

Assuming that the processor 110 calculates the overall fitness value according to the fitness values fv in Table 1 and that this overall fitness value is satisfied with the convergence condition, the processor 110 determines the Wi-Fi AP deployment plan(s) having the largest fitness value among the Wi-Fi AP deployment plans wAP1~wAP4 and determines the Bluetooth AP deployment plan having the largest fitness value among the Bluetooth AP deployment plans bAP1~bAP4. As shown in FIG. 5, the deployment position values of the Wi-Fi AP deployment plan wAP1 are [1001 0000 0000 0000], and the deployment position values of the Bluetooth AP deployment plan bAP2 are [0000 0000 0100 0000]. Thus, the most suitable position coordinate of the Wi-Fi access point W1 is found to be 0, the most suitable position coordinate of the Wi-Fi access point W2 is found to be 3, and the most suitable position coordinate of the Bluetooth access point BL is found to be 9.

In the present disclosure, by repeatedly executing steps S230~S260, the processor 110 can select Wi-Fi AP deployment plans and Bluetooth AP deployment plans which are not suitable to make the overall fitness value be gradually satisfied with the convergence condition. As a result, the most suitable position coordinates for the Wi-Fi access points and the Bluetooth access points can be found according to the deployment position values of the eventually determined Wi-Fi AP deployment plan and the eventually determined Bluetooth AP deployment plan.

By using the automatic access point deployment method and the automatic access point deployment device provided by the present disclosure, even though the number of the wireless access points may be restricted because of cost-aware policies, these wireless access points (including the Wi-Fi access points and the Bluetooth access points) can be automatically deployed at the most suitable position coordinates of the coordinate map in an indoor environment. Therefore, the performance of wirelessly monitoring the indoor environment by using these wireless access points can be effectively improved and the accuracy of positioning a portable device within the indoor environment by using these wireless access points can be increased.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A method for automatically deploying a plurality of wireless APs according to different position coordinates within an indoor environment by using a device for automatically deploying access point, comprising:
   step 1: building a coordinate map of the indoor environment, wherein the coordinate map includes a plurality of rows and columns, and a plurality of position coordinates are defined by the rows and columns by a processor of the device of automatically deploying access point;
   step 2: a number of the wireless APs by the processor of the device of automatically deploying access point, the wireless APs include at least one Wi-Fi AP and at least one Bluetooth AP, the Wi-Fi AP and the Bluetooth AP respectively correspond to a plurality of Wi-Fi AP deployment plans and a plurality of Bluetooth AP deployment plans, and each of the Wi-Fi AP deployment plans and the Bluetooth AP deployment plans has a plurality of deployment position values, the deployment position values of each Wi-Fi AP deployment plan indicate position coordinates of the Wi-Fi AP within the indoor environment, and the deployment position values of each Bluetooth AP deployment plan indicate position coordinates of the Bluetooth AP within the indoor environment;
   step 3: calculating a fitness value for each Wi-Fi AP deployment plan and a fitness value for each Bluetooth AP deployment plan according to the request information by the processor of the device of automatically deploying access point;
   step 4: calculating an overall fitness value according to the fitness values of the Wi-Fi AP deployment plan and the Bluetooth AP deployment plan, and determining whether the overall fitness value satisfies a convergence condition by the processor of the device of automatically deploying access point;
   step 5: when the overall fitness value does not satisfy the convergence condition, determining a number of the Wi-Fi AP deployment plans of which the deployment position values have to be exchanged and a number of the Bluetooth AP deployment plans of which the deployment position values have to be exchanged, and accordingly exchanging parts of deployment position values of the Wi-Fi AP deployment plans and exchanging parts of deployment position values of the Bluetooth AP-deployment plans by the processor of the device of automatically deploying access point; and
   step 6: changing at least one deployment position value of at least one non-exchanged Wi-Fi AP deployment plan, changing at least one deployment position value of at least one non-exchanged Bluetooth AP deployment plan by the processor of the device of automatically deploying access point, and then returning to step 3;
   wherein in the step of exchanging the parts of the deployment position values of the Wi-Fi AP-deployment plans, the parts of the deployment position values of the Wi-Fi AP deployment plans are exchanged according to an exchanging ratio.

2. The method according to claim 1, further comprising: when the overall fitness value satisfies the convergence condition, determining which one of the Wi-Fi AP deployment plans has the largest fitness value, and determining which one of the Bluetooth AP deployment plans has the largest fitness value by the processor of the device of automatically deploying access point.

3. The method according to claim 1, wherein the step of calculating the fitness value for each Wi-Fi AP deployment plan and each Bluetooth AP deployment plan further includes:
   calculating a Wi-Fi signal coverage and a Wi-Fi throughput according to a Wi-Fi signal strength corresponding to each deployment position value of each Wi-Fi AP deployment plan, and calculating the fitness value of each Wi-Fi AP deployment plan according to the Wi-Fi signal coverage and the Wi-Fi throughput; and
   calculating an amount of the Bluetooth signal coverage and a non-overlapping percentage of the Bluetooth AP according to a Bluetooth signal strength corresponding to each deployment position value of each Bluetooth AP deployment plan, and calculating the fitness value of each Bluetooth AP deployment plan according to the amount of the Bluetooth signal coverage and the non-overlapping percentage of the Bluetooth signal coverage.

4. The method according to claim 1, wherein the request information includes a number of the Wi-Fi AP deployment plans corresponding to the Wi-Fi AP, and a number of the Bluetooth AP deployment plans corresponding to the Bluetooth AP.

5. The method according to claim 1, wherein in the step of exchanging the parts of the deployment position values of the Wi-Fi AP deployment plans and exchanging the parts of the deployment position values of the Bluetooth AP deployment plans, a number of the Wi-Fi AP deployment plans of which the deployment position values have to be exchanged and a number of the Bluetooth AP deployment plans of which the s deployment position values have to be exchanged are determined according to an exchanging ratio, and accordingly the Wi-Fi AP-deployment plans and the Bluetooth AP deployment plans are randomly selected for exchanging their deployment position values.

6. The method according to claim 1, wherein in the step of exchanging the parts of the deployment position values of the Bluetooth AP deployment plans, the parts of the deployment position values of the Bluetooth AP deployment plans are exchanged according to an exchanging ratio.

7. The method according to claim 1, wherein the request information includes a number of the Wi-Fi AP deployment plans of which the deployment position values have to be changed and a number of the Bluetooth AP deployment plans of which the deployment position values have to be changed, and wherein the deployment position values of the Wi-Fi AP deployment plans and the deployment position values of the Bluetooth AP deployment plans have not been exchanged yet.

8. The method according to claim 1, wherein the request information includes a number of deployment position values to be changed.

9. The method according to claim 1, wherein the request information includes a rate of change, and the step of changing the at least one deployment position value of the at least one non-exchanged Wi-Fi AP deployment plan and changing the at least one deployment position value of the at least one non-exchanged Bluetooth AP deployment plan further comprises:
   randomly generating a possibility value;
   if the possibility value is less than the rate of change, changing the at least one deployment position value of the at least one non-exchanged Wi-Fi AP deployment plan, and changing the at least one deployment position value of the at least one non-exchanged Bluetooth AP deployment plan, and then returning to step 3; and
   if the possibility value is larger than or equal to the rate of change, again calculating a fitness value for each Wi-Fi AP deployment plan and each Bluetooth AP deployment plan.

10. The method according to claim 1, wherein the convergence condition indicates a predetermined times of executing the steps from step 3 to step 6.

11. The method according to claim 1, wherein the convergence condition indicates that the overall fitness value is larger than or equal to a predetermined fitness value.

12. A device for automatically deploying wireless APs, comprising:
   a storage device, storing a request information, wherein the request information includes a number of the wireless APs, and the wireless APs include at least one Wi-Fi AP and at least one Bluetooth AP; and
   a processor, electrically connected to the storage device and configured to build a coordinate map of an indoor environment, wherein the coordinate map includes a plurality of rows and columns, and a plurality of position coordinates are defined by the rows and columns;
   wherein the processor is configured to set the request information, wherein the request information includes the number of the wireless APs, the Wi-Fi AP and the Bluetooth AP respectively correspond to a plurality of Wi-Fi AP deployment plans and a plurality of Bluetooth AP deployment plans, each of the Wi-Fi AP deployment plans and the Bluetooth AP deployment plans has a plurality of deployment position values, the deployment position values of each Wi-Fi AP deployment plan indicate position coordinates of the Wi-Fi AP within the indoor environment, and the deployment position values of each Bluetooth AP deployment plan indicate position coordinates of the Bluetooth AP within the indoor environment;
   wherein the processor is configured to calculate a fitness value for each Wi-Fi AP deployment plan and each Bluetooth AP deployment plan according to the request information;
   wherein the processor is configured to calculate an overall fitness value according to the fitness values of the Wi-Fi deployment plans and the Bluetooth deployment plans, and determining whether the overall fitness value satisfies a convergence condition;
   wherein when the overall fitness value does not satisfy the convergence condition, the processor is configured to determine a number of the Wi-Fi AP deployment plans of which the deployment position values have to be exchanged and a number of the Bluetooth AP deployment plans of which the deployment position values have to be exchanged, and accordingly exchange parts of deployment position values of the Wi-Fi AP deployment plans, and exchanging parts of deployment position values of the Bluetooth AP-deployment plans, wherein the parts of the deployment position values of the Wi-Fi AP deployment plans are exchanged according to an exchanging ratio; and
   wherein the processor is configured to change at least one deployment position value of at least one non-exchanged Wi-Fi AP deployment plan, changing at least one deployment position value of at least one non-exchanged Bluetooth AP deployment plan, and then returning to step 3.

13. The device according to claim 12, wherein when the overall fitness value satisfies the convergence condition, the processor determines which one of the Wi-Fi AP deployment plans has the largest fitness value, and the processor determines which one of the Bluetooth AP deployment plans has the largest fitness value.

14. The device according to claim 12, wherein the processor is configured to calculate a Wi-Fi signal coverage and a Wi-Fi throughput according to a Wi-Fi signal strength corresponding to each deployment position value of each Wi-Fi AP deployment plan, and calculate the fitness value of each Wi-Fi deployment plan according to the Wi-Fi signal coverage and the Wi-Fi throughput; and
   the processor is configured to calculate an amount of the Bluetooth signal coverage and a non-overlapping percentage of the Bluetooth AP according to a Bluetooth signal strength corresponding to each deployment position value of each Bluetooth AP deployment plan, and calculating the fitness value of each Bluetooth AP deployment plan according to the amount of the Bluetooth signal coverage and the non-overlapping percentage of the Bluetooth signal coverage.

* * * * *